Patented July 10, 1934

1,965,962

UNITED STATES PATENT OFFICE 1,965,962

PRODUCTION OF UNSATURATED HYDROCARBONS

Martin Luther, Mannheim, and Hans Beller, Ludwigshafen - on - the - Rhine, Germany, assignors to I. G. Farbenindustrie Aktiengesellschaft, Frankfort-on-the-Main, Germany No Drawing. Application August 28, 1930, Serial No. 478,550. In Germany September 28, 1929. Renewed March 28, 1934

9 Claims. (Cl. 260—170)

The present invention relates to the production of unsaturated hydrocarbons.

We have found that liquid, unsaturated hydrocarbons, especially those of high molecular weight are obtained in good yields by converting liquid or solid paraffin or naphthene hydrocarbons, preferably in the liquid phase, into oxygen-containing organic products by treatment with an oxidizing agent, the resulting oxidation products containing alcohols, hydroxy acids, esters, lactones, aldehydes, ketones or other oxygenated compounds or mixtures thereof then being subjected to such high temperatures, preferably in the presence of catalysts, that they split off water or carbon dioxide or water and carbon dioxide. The carboxylic acids contained in the oxidation products, especially the higher homologues of acetic acid, which according to the present invention are not converted into unsaturated hydrocarbons may be first separated from the oxidation products, for example by treatment with alkali, the remaining residue then being further worked up in the manner hereinbefore described. If desired the separate constituents of the oxidation mixture which is to be converted, as for example the compounds insoluble in petroleum ether, may be separated and subjected each by themselves to the reaction for splitting off water or carbon dioxide or water and carbon dioxide. Soluble in petroleum ether are the ordinary carboxylic acids, the alcohols, esters, unsaturated acids and the not converted hydrocarbons. Hydroxy acids and derivatives thereof such as lactones are not soluble in petroleum ether. The splitting off of water or carbon dioxide is effected at temperatures above 150° C. preferably above 180° C. The splitting temperature depends among other facts on the nature of the catalyst employed. According to the present invention, alcohols are converted into unsaturated hydrocarbons by splitting off water, lactones or unsaturated acids by splitting off carbon dioxide and hydroxy acids and the like by splitting off water and carbon dioxide. Esters are probably converted in such a manner that carbon dioxide is split off, the chains of carbon atoms being broken in two pieces forming a saturated and an unsaturated hydrocarbon.

As examples of initial materials for the process according to the present invention may be mentioned liquid or solid saturated hydrocarbons, especially those boiling above about 180° C., for example the paraffin series such as hard or soft paraffin, ceresine, heavy oils and middle oils, as for example heating oils, and also naphthene hydrocarbons, such as paraffin oil, and petroleum fractions such as gas oil, and also hydrocarbons obtained synthetically, such as the products prepared by the destructive hydrogenation carried out at temperatures above 300° C. and at pressures of at least 20 atmospheres or by low temperature carbonization of coals, brown coal, tars and the like.

The oxidation of these hydrocarbons is effected in the already known manner with oxidizing agents either in the gaseous or in the liquid phase, for example with gases containing or supplying oxygen at atmospheric or other pressures, and the oxidizing reaction may be conducted in a definite direction, as for example so that mainly alcohols are formed, by the employment of specific catalysts, as for example boric acid or vanadium oxide. When oxidizing in the liquid phase it is preferable to work at temperatures ranging from 88° to 180° C. Further particulars may be seen from the U. S. Patents Nos. 1,788,799, 1,762,688, 1,158,205 and 335,962 from the British Patents Nos. 324,189, 310,069, 303,069 and 258,099 and from the German Patents Nos. 524,354, 489,936, 467,930 and 405,850 all referring to the conversion of solid or liquid hydrocarbons of the paraffinic or naphthenic series into oxygen-containing organic products by treatment with oxidizing agents. Since by the oxidation in the liquid or gaseous phase, carbonyl compounds such as aldehydes or ketones may frequently be formed in addition to the acids, esters, alcohols and the like, it is preferable in some cases to subject the oxidation products to a hydrogenation before the further working up, whereby the oxygen containing non-alcoholic compounds are converted into the corresponding alcohols. This hydrogenation may for example be effected at a temperature of about 180° C. and at a pressure of between 50 and 100 atmospheres with the aid of a catalyst containing nickel.

If it is mainly a question of working up alcohols, the splitting off of water may be effected for example by simple heating or distilling at ordinary or other pressures, and the reaction may be assisted by the employment of dehydrating catalysts. The crude oxidation product rich in alcohols may be directly subjected to distillation, and a distillate is obtained in which, in addition to unattacked paraffin and fatty acids which have passed over without decomposition, there are large amounts of liquid unsaturated hydrocarbons which may be separated by known methods. The preparation of the unsaturated hydrocarbons may also be combined with the recovery of pure acids, by first separating the acid constituents from the oxidation product by known methods, as for example by treatment with alkaline agents, the residue then being worked up in the manner hereinbefore described. Likewise the residue obtained by the protective distillation of the crude oxidation product or of the acid constituents separated therefrom, carried out for example with steam, inert gases or vapours with or without a vacuum, may be converted to a great extent into unsaturated liquid hydrocarbons for example by a further distillation at ordinary or increased pressure, a coky residue being left behind.

In cases when recovering liquid unsaturated hydrocarbons from the acid constituents of the oxidation product which are insoluble in petroleum ether, as for example hydroxy acids and the like, the formation of which may also be assisted catalytically as for example by the employment of iron, the distillation is carried out in the presence of catalysts, which not only assist the splitting off of water but also the splitting off of carbon dioxide, such as finely divided metallic copper or nickel and the like, and advantageously at ordinary or increased pressure, and in this manner liquid unsaturated hydrocarbons are likewise formed with the simultaneous splitting off of water and carbon dioxide. The said catalysts favouring the splitting off of water and carbon dioxide simultaneously may of course also be employed for splitting off water or carbon dioxide alone, for example in the case of treating alcohols or esters respectively.

The following examples will further illustrate the nature of this invention but the invention is not restricted to these examples.

Example 1

Russian gas oil is oxidized in the liquid phase at 160° C. by blowing in air during the course of 7 hours in the presence of an organic compound of manganese as a catalyst, and the resulting oxidation product, which has a saponification value of 170, is distilled at a pressure of about 15 millimetres mercury, water and carbon dioxide being thus split off. The acid constituents of the distillate are removed by treatment with alkalies and the unsaponifiable fraction is separated by known methods, as for example by treatment with liquid sulphur dioxide. The hydrocarbons employed as the initial material and the unsaturated hydrocarbons obtained have the following constants:

| Product | Iodine value | Viscosity at 20° C. | Specific gravity at 25° C. | Boiling temperature in degrees C. |
|---|---|---|---|---|
| Russian gas oil as initial material. | 7.4 | 1.4° Engler | 0.849 | 170° to 345° at 750 millimetres. |
| Unsaturated hydrocarbons. | 40.0 | 3.7° Engler | 0.907 | 100° to 320° at from 6 to 10 millimetres. |

Example 2

Hard paraffin is oxidized in the liquid phase at 140° C. by blowing in air and the resulting crude product is distilled under a vacuum of from about 30 to 70 millimetres mercury gauge while passing therethrough a weak current of carbon dioxide until a residue of from about 10 to 15 per cent remains, whereby the temperature in the body of the still may amount to about 350° C. The distillation residue is then further distilled at atmospheric pressure without passing gas therethrough, and the unsaturated hydrocarbons which distil over are obtained in a good yield. The distillate has an iodine value of about 80.

Example 3

The constituents insoluble in petroleum ether separated from an oxidation product, obtained by blowing air at about 160° C. and in the presence of barium cinnamate through soft paraffin, are slowly distilled at atmospheric pressure up to about 380° C., the vapours being led over finely divided metallic copper deposited on pumice stone. In this manner a splitting off of carbon dioxide takes place in addition to the splitting off of water, and in the distillate there is a good yield of unsaturated liquid hydrocarbons which, after isolation, have an iodine value of 130 and boil between 80° and 200° C. at about 20 millimetres mercury gauge.

What we claim is:—

1. A process for the production of unsaturated liquid hydrocarbons of high molecular weight from a material selected from the group consisting of solid and liquid hydrocarbons of the paraffin and of the naphthene series, boiling above about 180° C., which comprises converting said material into oxygen-containing organic compounds by treatment in the liquid phase with an oxidizing agent at a temperature between 80° and 180° C. and subjecting that portion of the oxidation product which is insoluble in petroleum ether to a thermal treatment at a temperature of at least 150° C., but below the temperature at which any substantial cracking takes place, whereby at least one of the compounds, water and carbon dioxide, is split off.

2. A process for the production of unsaturated liquid hydrocarbons of high molecular weight from a material selected from the group consisting of solid and liquid hydrocarbons of the paraffin and of the naphthene series, boiling above about 180° C., which comprises converting said material into oxygen-containing organic compounds by treatment in the liquid phase with an oxidizing agent at a temperature between 80° and 180° C. and subjecting that portion of the oxidation product which is insoluble in petroleum ether to a thermal treatment at a temperature of at least 150° C., but below the temperature at which substantial cracking takes place, in the presence of a catalyst capable of splitting off one of the compounds, water and carbon dioxide, at the temperature employed.

3. A process for the production of unsaturated liquid hydrocarbons of high molecular weight from paraffin wax, which comprises converting the paraffin wax into oxygen-containing organic compounds by treatment in the liquid phase with an oxidizing agent at a temperature between 80° to 180° C. and subjecting that portion of the oxidation product which is insoluble in petroleum ether to a thermal treatment at a temperature of at least 150° C., but below the temperature at which substantial cracking takes place, whereby at least one of the compounds, water and carbon dioxide, is split off.

4. A process for the production of unsaturated liquid hydrocarbons of high molecular weight from paraffin wax, which comprises converting the paraffin wax into oxygen-containing organic compounds by treatment in the liquid phase with an oxidizing agent at a temperature between 80° and 180° C. and subjecting that portion of the oxidation product which is insoluble in petroleum ether to a thermal treatment at a temperature of at least 150° C., but below the temperature at which substantial cracking takes place, in the presence of a catalyst capable of splitting off one of the compounds water and carbon dioxide at the temperature employed.

5. A process for the production of unsaturated liquid hydrocarbons of high molecular weight from paraffin wax, which comprises converting the paraffin wax into oxygen-containing compounds by treatment in the liquid phase with an oxidizing agent at a temperature of about 160° C., distilling that portion of the oxidation product which is insoluble in petroleum ether at a temperature up to about 380° C. and contacting the distillation vapors with a catalyst capable of splitting off carbon dioxide and water at the temperature employed.

6. A process for the production of unsaturated liquid hydrocarbons of high molecular weight from a material selected from the group consisting of solid and liquid hydrocarbons of the paraffin and of the naphthene series, boiling above about 180° C., which comprises converting said material into oxygen containing organic compounds by treatment in the liquid phase with an oxidizing agent at a temperature between 80° and 180° C. and subjecting that portion of the oxidation product which is insoluble in petroleum ether to a thermal treatment at a temperature of at least 150° C., but below the temperature at which substantial cracking takes place, in the presence of a catalyst capable of splitting off carbon dioxide at the temperature employed.

7. A process for the production of unsaturated liquid hydrocarbons of high molecular weight from a material selected from the group consisting of solid and liquid hydrocarbons of the paraffin and of the naphthene series, boiling above 180° C., which comprises converting said material into oxygen-containing organic compounds by treatment thereof in the liquid phase with an oxidizing agent at a temperature between 80° and 180° C. and subjecting the oxidation product to a thermal treatment at a temperature ranging from 150° C. to about 380° C., but below the temperature at which any substantial cracking takes place and under a pressure not substantially exceeding atmospheric pressure in the presence of a catalyst capable of splitting off carbon dioxide at the temperature employed.

8. A process for the production of unsaturated liquid hydrocarbons of high molecular weight from a hydrocarbon material having a boiling point approximating that of paraffin wax, which comprises converting said material into oxygen-containing organic compounds by treatment in the liquid phase with an oxidizing agent at a temperature between 80° and 180° C. and subjecting the oxidation product to a thermal treatment at a temperature of at least 150° C., but below the temperature at which any substantial cracking takes place in the presence of a catalyst capable of splitting off carbon dioxide at the temperature employed.

9. A process for the production of unsaturated liquid hydrocarbons of high molecular weight from a material selected from the group consisting of solid and liquid hydrocarbons of the paraffin and of the naphthene series, boiling above about 180° C., which comprises converting said material into oxygen-containing organic compounds by treatment thereof in the liquid phase with an oxidizing agent at a temperature between 80° and 180° C., subjecting the oxidation product to distillation under reduced pressure until the major portion thereof is distilled and a substantial residue having a boiling point above 350° C. under a vacuum of 30 to 70 millimetres of mercury is left and then distilling the residue at atmospheric pressure whereby water and carbon dioxide are split off.

MARTIN LUTHER.
HANS BELLER.